(12) United States Patent
Nagashima

(10) Patent No.: US 8,749,654 B2
(45) Date of Patent: Jun. 10, 2014

(54) DETECTING OBJECTS FROM IMAGES OF DIFFERENT RESOLUTIONS

(75) Inventor: Fumitada Nagashima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 12/903,017

(22) Filed: Oct. 12, 2010

(65) Prior Publication Data

US 2011/0090360 A1 Apr. 21, 2011

(30) Foreign Application Priority Data

Oct. 19, 2009 (JP) ................................. 2009-240608

(51) Int. Cl.
*H04N 5/225* (2006.01)
*G06K 9/64* (2006.01)

(52) U.S. Cl.
USPC ....................................... 348/222.1; 382/190

(58) Field of Classification Search
USPC ........ 348/222.1; 382/162, 163, 173, 190, 195
See application file for complete search history.

(56) References Cited

U.S. PATENT DOCUMENTS

| | | | |
|---|---|---|---|
| 2006/0110029 A1 | 5/2006 | Kazui et al. | 382/159 |
| 2007/0071319 A1* | 3/2007 | Fukushima | 382/173 |
| 2009/0022403 A1* | 1/2009 | Takamori et al. | 382/195 |
| 2009/0207266 A1* | 8/2009 | Yoda | 348/222.1 |
| 2009/0256926 A1* | 10/2009 | Okada et al. | 348/222.1 |
| 2010/0079623 A1* | 4/2010 | Tomita | 348/240.99 |
| 2010/0232712 A1* | 9/2010 | Tomita et al. | 382/209 |

FOREIGN PATENT DOCUMENTS

| | | |
|---|---|---|
| JP | 2000-270298 | 9/2000 |
| JP | 2006-146626 | 6/2006 |
| WO | WO 2008129875 A1 * | 10/2008 |

OTHER PUBLICATIONS

Ming-Hsuan Yang, et al., "Detecting Faces in Images: A Survey", IEEE Transactions On Pattern Analysis and Machine Intelligence, vol. 24, No. 1, Jan. 2002.

Henry A. Rowley, et al., "Neural Network-Based Face Detection", IEEE Transactions On Pattern Analysis and Machine Intelligence, vol. 20, No. 1, Jan. 1998.

* cited by examiner

*Primary Examiner* — Twyler Haskins
*Assistant Examiner* — Dwight C Tejano
(74) *Attorney, Agent, or Firm* — Fitzpatrick, Cella, Harper & Scinto

(57) ABSTRACT

An image is input on a frame unit basis, the input image is sequentially reduced, and an object is detected from the input image and the reduced image at a frame rate according to a reduction ratio of the reduced image to the input image, thereby decreasing an amount of calculations necessary to detect the object from the image.

4 Claims, 4 Drawing Sheets

DETECTING OBJECTS FROM IMAGES OF DIFFERENT RESOLUTIONS

BACKGROUND OF THE INVENTION

1. Field of the Invention

The present invention relates to an image processing apparatus and an object detecting method.

2. Description of the Related Art

An image processing method of automatically detecting a specific object pattern from an image is very useful and can be used, for example, for a discrimination of a human face. Such a method can be used in many fields such as communication conference, man-machine interface, security, monitor system for tracing the human face, image compression, and the like. As such a technique for detecting the face from the image, various kinds of systems have been mentioned in, for example, Yang et al., "Detecting Faces in Images: A Survey", IEEE TRANSACTIONS ON PATTERN ANALYSIS AND MACHINE INTELLIGENCE, Vol. 24, No. 1, January 2002. Among them, a system for detecting the human face by using some typical features (two eyes, mouse, nose, etc.) and peculiar geometrical positional relations among those features is shown.

For example, the system proposed in Rowley et al., "Neural network-based face detection", IEEE TRANSACTIONS ON PATTERN ANALYSIS AND MACHINE INTELLIGENCE, Vol. 20, No. 1, January 1998 is a method of detecting a face pattern in an image by a neural network. The face detecting method disclosed in such a literature will be simply described hereinbelow.

First, an apparatus reads image data in which the face is detected as a target into a memory and extracts a predetermined area to be collated with the face from the read image. The apparatus inputs distribution of pixel values of the extracted area and obtains one output by an arithmetic operation by the neural network. At this time, a weight and a threshold value of the neural network have previously been learned by a very large number of face image patterns and non-face image patterns. For example, when an output of the neural network is equal to or larger than 0, the apparatus determines the object as a face, and when the output is a value other than it, the apparatus decides the object as a non-face. In the apparatus, an extracting position of the image pattern which is collated with the face as an input of the neural network is scanned, for example, sequentially in the vertical and lateral directions from the whole image area, thereby detecting the face from the image. In order to cope with the detection of the faces of various sizes, the apparatus sequentially reduces the read image at a predetermined rate and performs the scan for the face detection mentioned above with respect to the reduced images.

In the case of applying the above face detection to a surveillance camera, it is demanded to preferentially detect a photographing object having a possibility that it will disappear from a display screen between frames. That is, this is because in the object in which a possibility that it will disappear from the display screen is high, if the object cannot be detected in a certain frame, since a possibility that it will disappear from the display screen is high, the object cannot be detected either in the next and subsequent frames.

The object having the possibility that it will disappear from the display screen is an object whose motion in the display screen is large. In other words, it is necessary to detect from the object whose motion in the display screen is large between the frames.

Whether the motion in the display screen is large or small depends on a distance between the object and the camera. For example, in FIG. 1, there are an object A and an object B. Even if the object A and the object B moved by the same amount, the motion of the object A is large because it is close to the camera. On the contrary, the motion of the object B is small because it is far from the camera. FIG. 1 is a diagram for describing relations between the camera and the objects to be photographed.

Subsequently, the object A which is close to the camera is displayed large. On the contrary, the object B which is far from the camera is displayed small.

In the surveillance camera, therefore, it is necessary that the object which was displayed large is detected preferentially to the object which was displayed small.

However, in the related art, since the face detecting process is necessary for images of various kinds of resolution, a calculation amount is large. For example, there is such a problem that in the case where the face detection was performed on the image of a large size, if the calculation is interrupted on the halfway, the face displayed large on the display screen cannot be detected. In the case where the face detection was performed on the image of a small size, if the calculation is interrupted on the halfway, the face displayed small on the display screen cannot be detected.

SUMMARY OF THE INVENTION

It is an object of the invention to decrease an amount of calculations necessary to detect an object from an image.

To solve the above problem, the present invention provides an image processing apparatus comprising: an image input unit configured to input an image on a frame unit basis; an image reducing unit configured to sequentially reduce the image input by the image input unit; and an object detecting unit configured to detect an object from the image input by the image input unit and the image reduced by the image reducing unit at a frame rate according to a reduction ratio of the image reduced by the image reducing unit to the image input by the image input unit.

Further features and aspects of the present invention will become apparent from the following detailed description of exemplary embodiments with reference to the attached drawings.

DESCRIPTION OF THE EMBODIMENTS

An embodiment of the invention will be described hereinbelow with reference to the drawings.

Figure 1:
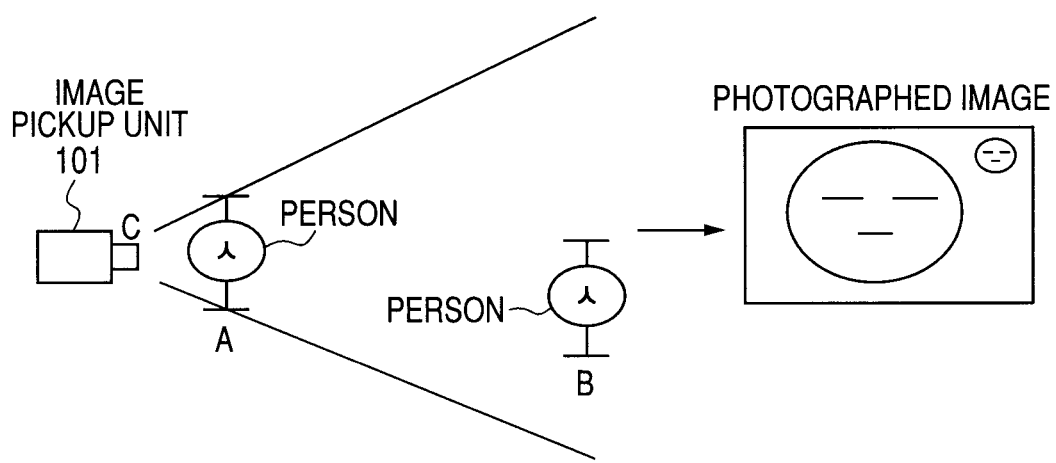
FIG. 1 is a diagram for describing relations between the camera and the objects to be photographed.
Figure 2:
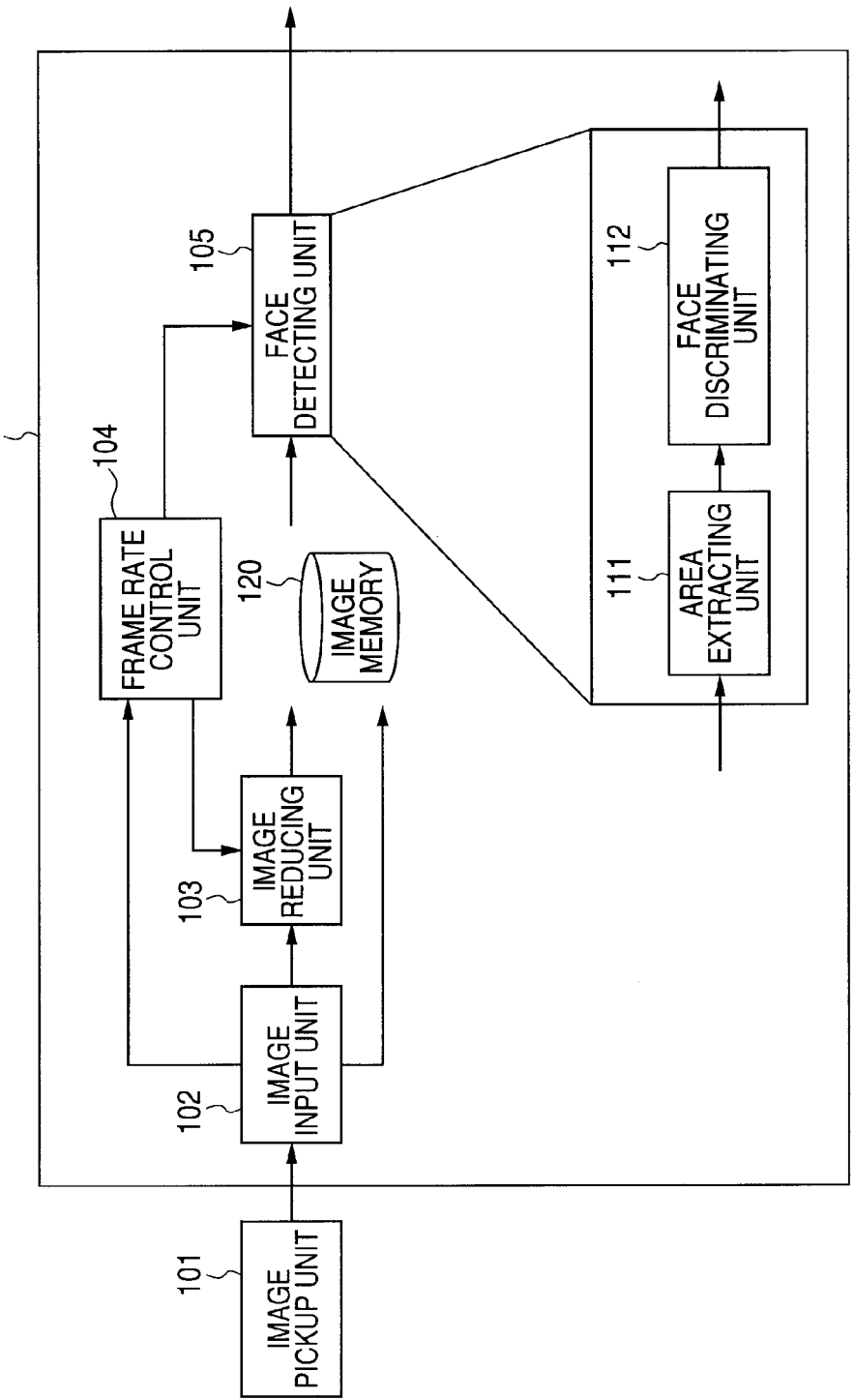
FIG. 2 is a diagram illustrating an example of a construction of an image processing apparatus.

FIG. 2 is a diagram illustrating an example of a construction of an image processing apparatus.

An image pickup unit 101 is constructed by, for example, a digital still camera, a camcoder, a film scanner, and the like and photographs image data.

An image input unit 102 obtains the image data photographed by the image pickup unit 101 at a predetermined time interval and outputs on a frame unit basis.

An image reducing unit 103 reduces the image data output from the image input unit 102 at a predetermined magnification and outputs.

A frame rate control unit 104 counts the number of input frames and controls so that the face detection of the reduced image is performed at a desired frame rate according to a reduction ratio.

An image memory 120 temporarily stores the image data output from the image input unit 102 and the image reducing unit 103.

A face detecting unit 105 extracts an area of the face from the image. The face detecting unit 105 is constructed by an area extracting unit 111 and a face discriminating unit 112, which will be described hereinbelow.

The area extracting unit 111 extracts a predetermined partial area from the image data stored in the image memory 120 as a pattern of a collating target.

The face discriminating unit 112 discriminates whether the collating pattern output from the area extracting unit 111 is a face pattern or a non-face pattern.

The operation of an image processing apparatus 100 will be described hereinbelow.

In the embodiment, an example in which the image processing apparatus 100 sequentially reduces the input image and the reduction image at a reduction ratio of 0.8 and detects a face in correspondence to it is shown. In the embodiment, the image processing apparatus 100 sets the reduction ratio to the input image whose frame rate is switched into 0.7 and 0.4. When the reduction ratio of the reduced image to the input image is equal to or larger than 0.7, the image is assumed to be a high resolution image adapted to detect the face displayed small. When the reduction ratio is less than 0.7 and is equal to or larger than 0.4, the image is assumed to be a middle resolution image adapted to detect the face displayed as a next small image. When the reduction ratio is smaller than 0.4, the image is assumed to be a low resolution image adapted to detect the face displayed large. Subsequently, the frame rate of the face detecting process is set to a rate of once per four frames in the case of the high resolution image, a rate of once per two frames in the case of the middle resolution image, and a rate of every frame in the case of the low resolution image, respectively. Subsequently, the operation of the embodiment will be described with reference to FIG. 3.

Figure 3:
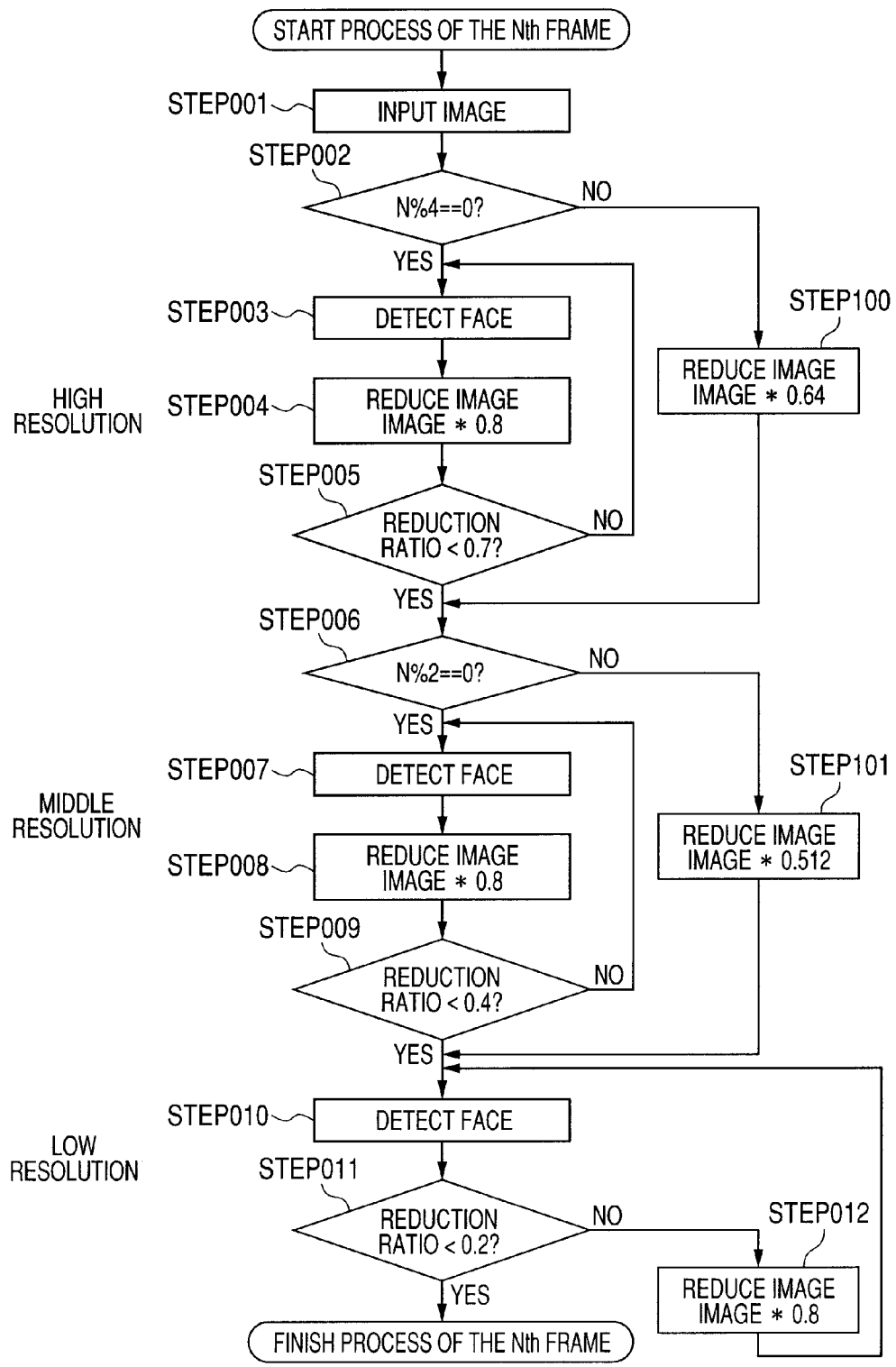
FIG. 3 is a flowchart illustrating an example of processes regarding an object detection.

FIG. 3 is a flowchart illustrating an example of processes regarding object detection.

First, the image input unit 102 obtains the image data photographed by the image pickup unit 101 (STEP 001). The obtained image data is 2-dimensional array data constructed by, for example, 8-bit pixels, and is constructed by three faces of R, G, and B. At this time, if the image data has been compressed by a system such as JPEG, the image input unit 102 decompresses the image data by a predetermined decompressing system, thereby forming image data constructed by RGB pixels. Further, in the embodiment, it is assumed that the RGB data is converted into luminance data (luminance image data) and the luminance image data is applied to the subsequent processes. In the case where the image input unit 102 inputs data of YCrCb as image data, a Y component may be used as luminance data as it is.

The image input unit 102 outputs the obtained image data to the image reducing unit 103 and the image memory 120.

The frame rate control unit 104 counts the number of input frames. The frame rate control unit 104 discriminates whether or not the Nth frame is a frame obtained once per four frames according to a count number (STEP 002).

First, a case where the frame rate control unit 104 determines that the Nth frame is not the frame obtained once per four frames will be described. That is, if a remainder obtained by dividing N by 4 is equal to a value other than 0, the face detecting unit 105 does not execute the face detecting process of the high resolution image. In this case, the image reducing unit 103 forms a reduction image of a magnification necessary in the face detecting process of the middle resolution image (STEP 100). In the face detecting process of the middle resolution image, the image of the reduction ratio less than 0.7 is necessary for the input image. Therefore, in STEP 100, the image reducing unit 103 reduces the input image at a magnification of 0.64 obtained by multiplying a magnification of 0.8 twice. That is, the image reducing unit 103 performs the reduction at the magnification of 0.64 to the input image which is output from the image input unit 102 and outputs the reduced image to the image memory 120.

Figure 4:
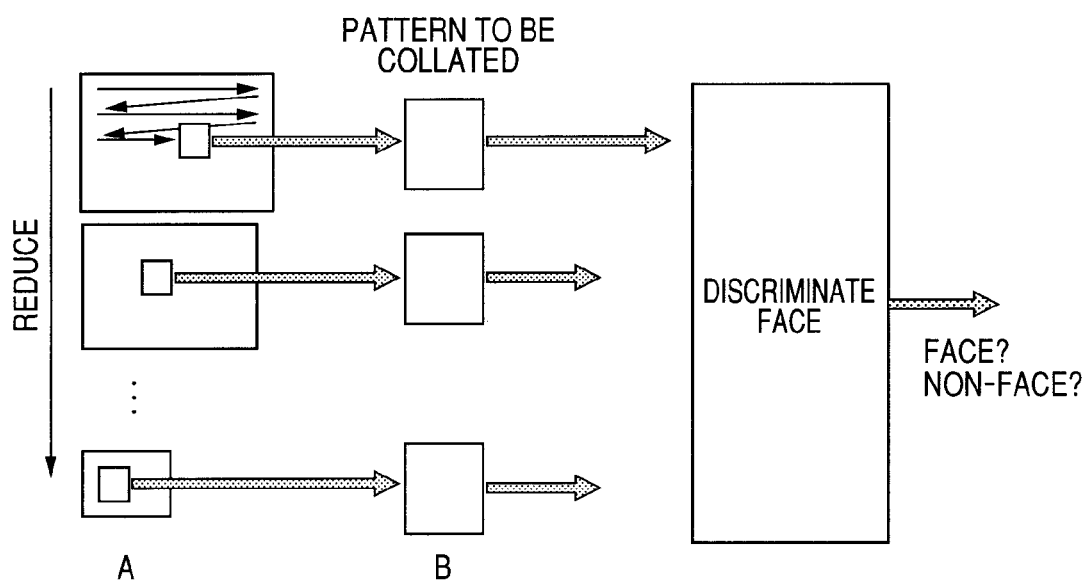
FIG. 4 is a diagram for describing a process for searching for a face pattern from an image.

Subsequently, a case where the frame rate control unit 104 determines that the Nth frame is the frame obtained once per four frames will be described. That is, if the remainder obtained by dividing N by 4 is equal to 0, the face detecting unit 105 executes the face detecting process to the input image held in the image memory 120 (STEP 003). First, the area extracting unit 111 selects and reads out the input image held in the image memory 120. The area extracting unit 111 extracts a partial area of a predetermined size from the read-out image data and outputs to the face discriminating unit 112. Such a state is illustrated in FIG. 4. A column of A in FIG. 4 illustrates the reduction images reduced by the image reducing unit 103. It is assumed here that a rectangular area of a predetermined size is extracted from each reduction image. A column of B in FIG. 4 illustrates a state of extraction on the way of repeating the operation for sequentially scanning each reduction image in the vertical and lateral directions.

The face discriminating unit 112 discriminates whether the collating pattern extracted by the area extracting unit 111 is a face pattern or a non-face pattern. As a face discriminating method in the face discriminating unit 112, for example, the method disclosed in Non-Patent Document 2 is used.

Subsequently, the image reducing unit 103 reduces the input image which is output from the image input unit 102 at the magnification of 0.8 (STEP 004). The image reducing unit 103 outputs the reduced image data to the image memory 120.

The frame rate control unit 104 compares the reduction ratio of the reduced image to the input image to see if it is smaller than 0.7 (STEP 005). If it is equal to or larger than 0.7, the face detecting unit 105 again executes the face detecting process to the smallest image among the reduction images held in the image memory 120 (STEP 003). Further, the image reducing unit 103 reduces the smallest image among the reduction images held in the image memory 120 at the magnification of 0.8 (STEP 004). The image reducing unit 103 outputs the reduced image data to the image memory 120. The processing routine advances to STEP 005 again. In this manner, the image is repetitively reduced until the reduction ratio to the input image decreases to a value smaller than 0.7 and the face detection of the high resolution image is finished.

Subsequently, the face detecting process of the middle resolution image will be described.

The frame rate control unit 104 discriminates whether or not the Nth frame is a frame obtained once per two frames (STEP 006).

First, a case where the frame rate control unit 104 determines that the Nth frame is not the frame obtained once per two frames will be described. That is, if a remainder obtained by dividing N by 2 is equal to a value other than 0, the face detecting unit 105 does not execute the face detecting process of the middle resolution image. In this case, it is necessary to form the reduction image of the magnification necessary for the face detecting process of the low resolution image (STEP 101). In the face detecting process of the low resolution image, the image of the reduction ratio less than 0.4 to the input image is necessary. The image has been reduced at the magnification of 0.64 to the input image in STEP 004 or STEP 100. Therefore, in STEP 101, in the image reducing unit 103, the image reduced in STEP 004 or STEP 100 is reduced at the magnification of 0.512 obtained by multiplying the magnification of 0.8 three times. That is, the image which is reduced in STEP 101 becomes the image reduced at the magnification of 0.32768 to the input image. Consequently, the image reducing unit 103 reduces the smallest image among the reduction images held in the image memory 120 at the magnification of 0.512 and outputs the reduced image data to the image memory 120.

Subsequently, a case where the frame rate control unit 104 determines that the Nth frame is the frame obtained once per two frames will be described. That is, if the remainder obtained by dividing N by 2 is equal to 0, the face detecting unit 105 executes the face detecting process to the smallest image among the reduction images held in the image memory 120 (STEP 007). Subsequently, the image reducing unit 103 reduces the smallest image among the reduction images held in the image memory 120 at the magnification of 0.8 (STEP 008). The image reducing unit 103 outputs the reduced image data to the image memory 120.

The frame rate control unit 104 compares the reduction ratio of the reduced image to the input image to see if it is smaller than 0.4 (STEP 009). If it is equal to or larger than 0.4, the face detecting unit 105 again executes the face detecting process to the smallest image among the reduction images held in the image memory 120 (STEP 007). After that, the image reducing unit 103 reduces the smallest image among the reduction images at the magnification of 0.8 (STEP 008). The image reducing unit 103 outputs the reduced image data to the image memory 120. The processing routine advances to STEP 009 again. In this manner, the image is repetitively reduced until the reduction ratio to the input image decreases to a value smaller than 0.4 and the face detection of the middle resolution image is finished.

Subsequently, a face detecting flow of the low resolution image will be described. The face detecting process of the low resolution image is executed every frame. The face detecting unit 105 executes the face detecting process to the smallest image among the reduction images held in the image memory 120 (STEP 010). Subsequently, the frame rate control unit 104 discriminates whether or not the face detection of the low resolution image at the reduction ratio of the low resolution image is finished. However, the reduction ratio is not the reduction ratio of the reduction images held in the image memory 120 but the frame rate control unit 104 compares the reduction ratio obtained in the case where the image has been reduced in next STEP 012. That is, the frame rate control unit 104 compares the reduction ratio obtained in the case where the image has been reduced in STEP 012 to the input image to see if it is smaller than 0.2 (STEP 011). If the reduction ratio of the image which is reduced by the image reducing unit 103 to the input image is less than 0.2, the processing routine is finished here.

If the reduction ratio of the image which is reduced by the image reducing unit 103 to the input image is equal to or larger than 0.2, the image reducing unit 103 reduces the smallest image among the reduction images held in the image memory 120 at the magnification of 0.8 (STEP 012). The image reducing unit 103 outputs the reduced image data to the image memory 120. After that, the face detecting unit 105 executes the face detecting process to the smallest image among the reduction images held in the image memory 120 (STEP 010). Similarly, the frame rate control unit 104 compares the reduction ratio of the image which is reduced in next STEP 012 to the input image to see if it is smaller than 0.2 (STEP 011).

In this manner, the image is repetitively reduced until the reduction ratio to the input image decreases to a value smaller than 0.2 and the face detection of the high resolution image is finished.

As mentioned above, in the image processing apparatus 100, the object displayed large is detected at a frame rate higher than the predetermined frame rate and the object displayed small is detected at a frame rate lower than the predetermined frame rate. Consequently, a processing load is reduced and the object near the camera can be recognized every frame.

Although the embodiment has been described above on the assumption that the reduction ratios of the input image and the reduction image are equal to 0.8, they are shown as an example and may be replaced to another reduction ratio.

Although the embodiments have been described above with respect to the cases where the reduction ratio of the reduction image to the input image at the time of switching the frame rate is equal to 0.7 and 0.4. That is, the embodiments have been described on the assumption that in the image processing apparatus 100, the detection of the object to be photographed (object) is performed to the image whose reduction ratio is equal to or larger than the predetermined reduction ratio (0.7 or more) and the detection of the object is performed to the image whose reduction ratio is less than the predetermined reduction ratio (0.4 or less). However, they are shown as an example and may be replaced to a plurality of other reduction ratios.

Although the embodiments have been described above on the assumption that the frame rate of the face detection is set to a rate of once per four frames in the case of the high resolution image, a rate of once per two frames in the case of the middle resolution image, and a rate of every frame in the case of the low resolution image, other frame rates may be used.

Although the embodiments have been described above with respect to the method of detecting the face pattern in the image from the images of a plurality of kinds of resolution in order to detect the faces of various sizes, the object which is detected by the face detecting unit 105 may be replaced to another object such as a human body.

According to the embodiments described above, an amount of calculations necessary to detect the object from the image can be reduced.

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-240608, filed Oct. 19, 2009, which is hereby incorporated by reference herein in its entirety.

What is claimed is:

1. An image processing apparatus comprising:
an image input unit configured to input a sequence of frame images;
an image generation unit configured to generate a plurality of sequences of frame images with different resolutions from the input sequence of frame images by transforming each image of the input sequence into images of lower resolutions;
a frame rate setting unit configured to set respective frame rates to the sequences of frame images of different resolutions generated by the image generation unit in accordance with their resolutions so that a lower frame rate is set to a sequence of frame images of a higher resolution; and
an object detecting unit configured to detect an identical type of object from whole images of respective images of the plurality of sequences of frame images with different resolutions generated by the image generation unit at the respective frame rates set by the frame rate setting unit.

2. The apparatus according to claim 1, wherein the frame rate setting unit sets a frame rate higher than a predetermined frame rate to an image in which the resolution is equal to or lower than a predetermined resolution and sets a frame rate lower than a predetermined frame rate to an image in which the resolution is higher than the predetermined reduction ratio resolution.

3. An object detecting method carried out in an image processing apparatus, the method comprising:
inputting a sequence of frame images;
generating a plurality of sequences of frame images with different resolutions from the input sequence of frame images by transforming each image of the input sequence into images of lower resolutions;
setting respective frame rates to the generated sequences of frame images of different resolutions in accordance with their resolutions, so that a lower frame rate is set to a sequence of frame images of a higher resolution; and
detecting an identical type of object from whole images of respective images of the plurality of sequences of frame images with different resolutions set at the respective frame rates.

4. A non-transitory computer-readable storage medium for storing a program that causes a computer to execute an object detecting method carried out in an image processing apparatus, the method comprising:
inputting a sequence of frame images;
generating a plurality of sequences of frame images with different resolutions from the input sequence of frame images by transforming each image of the input sequence into images of lower resolutions;
setting respective frame rates to the generated sequences of frame images of different resolutions in accordance with their resolutions, so that a lower frame rate is set to a sequence of frame images of a higher resolution; and
detecting an identical type of object from whole images of respective images of the plurality of sequences of frame images with different resolutions set at the respective frame rates.

* * * * *